United States Patent
Anderson et al.

(10) Patent No.: US 9,969,500 B2
(45) Date of Patent: May 15, 2018

(54) BIFURCATED DUCTS INCLUDING PLENUMS FOR STABILIZING FLOW THERETHROUGH AND EXHAUST SYSTEMS INCLUDING THE SAME

(71) Applicant: HONEYWELL INTERNATIONAL INC., Morristown, NJ (US)

(72) Inventors: Morris Anderson, Mesa, AZ (US); Yogendra Yogi Sheoran, Scottsdale, AZ (US); Doug Hollingshead, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 674 days.

(21) Appl. No.: 14/174,422

(22) Filed: Feb. 6, 2014

(65) Prior Publication Data

US 2015/0218967 A1 Aug. 6, 2015

(51) Int. Cl.
*B64D 33/04* (2006.01)
*F01D 25/30* (2006.01)

(52) U.S. Cl.
CPC ............ *B64D 33/04* (2013.01); *F01D 25/30* (2013.01); *F05D 2220/324* (2013.01); *F05D 2250/232* (2013.01)

(58) Field of Classification Search
CPC ... F02K 1/04; F02K 1/40; B64D 33/04; F01D 25/30; F05D 2250/232; F05D 2220/324
USPC .............. 60/39.5, 771, 224, 225; 239/265.19
See application file for complete search history.

(56) References Cited

U.S. PATENT DOCUMENTS

| | | | | |
|---|---|---|---|---|
| 2,708,340 | A | * | 5/1955 | Rainbow .................... F02K 3/10 60/263 |
| 3,164,337 | A | * | 1/1965 | Hooper .................. B64D 33/04 239/265.25 |
| 3,191,886 | A | | 6/1965 | Lewis et al. |
| 3,290,877 | A | * | 12/1966 | Millar ...................... F01D 25/30 415/211.2 |
| 3,388,550 | A | * | 6/1968 | Binek ...................... F01D 25/30 415/208.2 |
| 3,614,037 | A | | 10/1971 | Vdolek |

(Continued)

FOREIGN PATENT DOCUMENTS

| | | |
|---|---|---|
| GB | 899862 | 6/1962 |
| WO | 9954204 A1 | 10/1999 |

OTHER PUBLICATIONS

Heiser Ejector Thrust Augmentation 2010.*

(Continued)

*Primary Examiner* — William H Rodriguez
*Assistant Examiner* — William Breazeal
(74) *Attorney, Agent, or Firm* — Lorenz & Kopf, LLP

(57) ABSTRACT

Plenums for bifurcated ducts and bifurcated ducts are provided for stabilizing flow therethrough. The plenum comprises an outer cylindrical body intersected by a pair of exhaust duct stubs that are configured to be coupled to a corresponding pair of exhaust ducts and an inner body. The outer cylindrical body includes an axial rear end portion. The inner body is disposed in the axial rear end portion and increases in diameter in the aft direction. The inner body comprises one of a generally axi-symmetrical inner body or a non-axi-symmetrical inner body. The bifurcated duct comprises the plenum and the pair of exhaust ducts. Exhaust systems are also provided.

11 Claims, 5 Drawing Sheets

(56) References Cited

U.S. PATENT DOCUMENTS

| | | | | |
|---|---|---|---|---|
| 6,109,562 | A * | 8/2000 | Crone | B64D 33/04 |
| | | | | 244/119 |
| 6,672,424 | B2 | 1/2004 | Gadefait et al. | |
| 6,988,674 | B2 | 1/2006 | Steyer et al. | |
| 7,967,219 | B1 * | 6/2011 | Taylor | B64C 29/0066 |
| | | | | 239/265.19 |
| 2010/0034648 | A1 * | 2/2010 | Robertson | F01D 25/28 |
| | | | | 415/199.4 |
| 2010/0115967 | A1 * | 5/2010 | Maltson | F01D 5/186 |
| | | | | 60/806 |
| 2014/0331676 | A1 * | 11/2014 | Cramb | F23R 3/14 |
| | | | | 60/740 |

OTHER PUBLICATIONS

Extended EP search report for EP 15152396.6-1754 dated Jun. 18, 2015.

Patel, B. R.: Evaluation of the Performance of Single and Double Exit Hoods for Annular Exhaust Diffusers; Final Report for the International Consurtium for Industrial Annular Diffuser Development, Part 2; Technical Note, TN-277, Apr. 1978.

EP Exam Report for Application No. 15152396.6-1754 dated Dec. 14, 2017.

\* cited by examiner

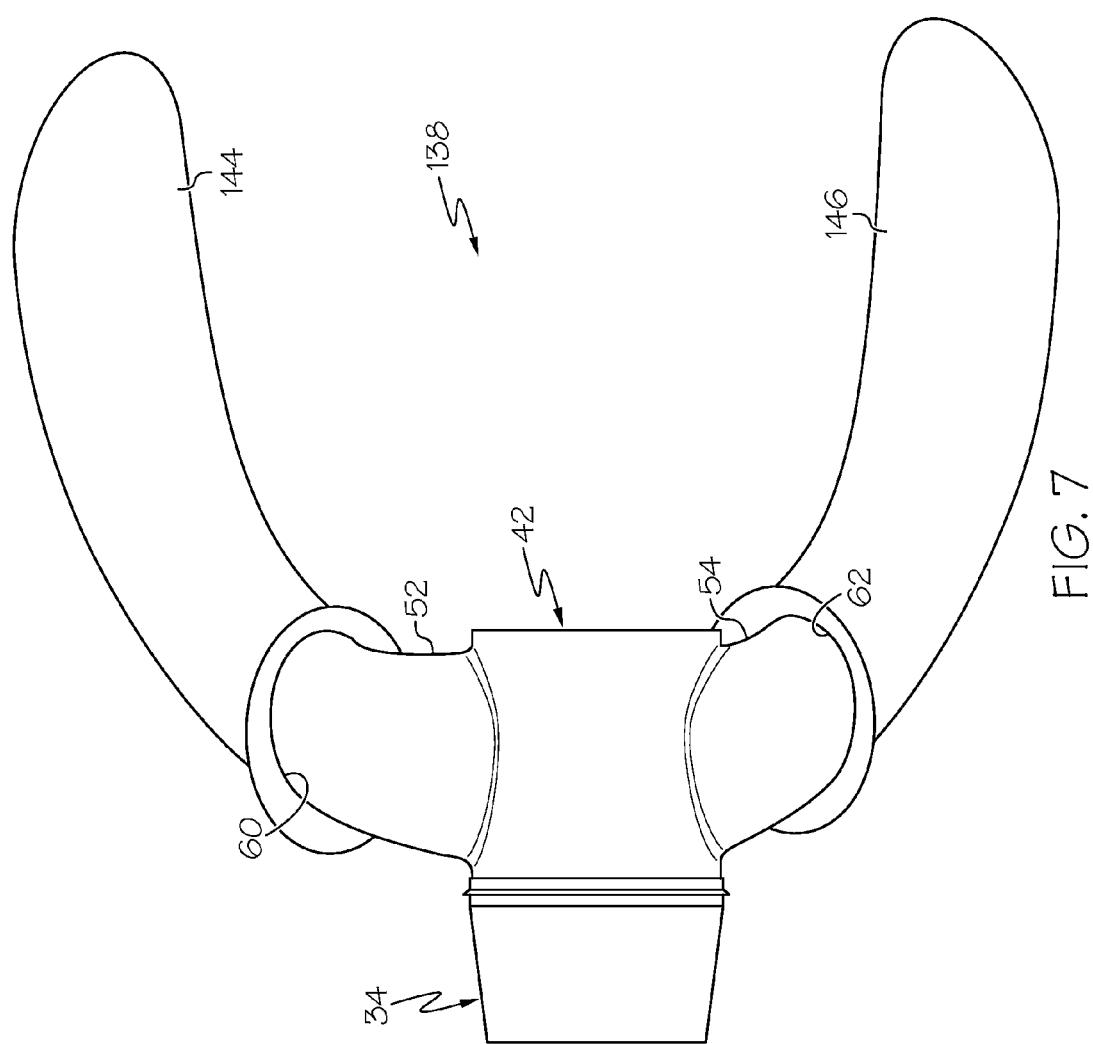

BIFURCATED DUCTS INCLUDING PLENUMS FOR STABILIZING FLOW THERETHROUGH AND EXHAUST SYSTEMS INCLUDING THE SAME

TECHNICAL FIELD

The present invention generally relates to gas turbine engines, and more particularly relates to bifurcated ducts including plenums for stabilizing flow therethrough and to exhaust systems including the same.

BACKGROUND

A gas turbine engine combusts a mixture of compressed air and fuel to produce hot combustion gases. The combustion gases flow through one or more stages of turbine blades to generate power. The power output of the gas turbine engine may be utilized in a variety of different manners, depending upon whether the gas turbine engine assumes the form of a turbofan, turboprop, turboshaft, turbojet engine, or an auxiliary power unit, to list but a few examples. The gas turbine engine conveys the combustion gases into a diffuser in an exhaust section that reduces energy of the combustion gases prior to discharge into the atmosphere. The reduced-energy combustion gases are referred to herein as "exhaust gas".

After exiting the diffuser, the exhaust gas may enter a bifurcated duct (more particularly, a plenum of a bifurcated duct). A bifurcated duct may be used in a single engine airplane where the engine is in the front of the aircraft and a firewall prevents passage of the exhaust gas through the aft portion of the engine compartment. Therefore, the bifurcated duct splits the flow of exhaust gas, directing a portion of the exhaust gas in one direction through a first exhaust duct and directing another portion of the exhaust gas in another direction through a second exhaust duct for discharge into the atmosphere on both sides of the airplane, thereby bypassing the firewall.

In an exhaust system that includes a conventional bifurcated duct, the exhaust gas enters a high-volume plenum that causes a sudden expansion and turning of the flow, increasing turbulence and unsteady flow behavior inside the plenum and producing non-uniform flow to downstream components. The high-volume plenum abruptly guides the exhaust gas at an angle away from the first longitudinal axis of the gas turbine engine (e.g., approximately 90 degrees) into the first and second exhaust ducts. This abrupt change in the direction of flow (e.g., axial to radial) increases the turbulence (e.g. swirling motion of the gas) and flow separation, thereby significantly increasing backpressure. Such unsteady flow of exhaust gas through the conventional bifurcated duct can also cause noise and damage to surrounding structures. Thus, conventional bifurcated ducts have abrupt turns and expansions, creating significant backpressure, flow separation, unsteady flow, and turbulence therein, thereby reducing performance of the gas turbine engine. Other conventional bifurcated ducts are also susceptible to significant backpressure, flow separation, and turbulence therein caused by unsteady fluid flow therethrough.

Hence, there is a need for bifurcated ducts (inclusive of bifurcated exhaust ducts) including plenums for stabilizing flow therethrough and for exhaust systems including the same. There is also a need to reduce backpressure, flow separation, unsteady flow, and turbulence within the bifurcated ducts, thereby reducing noise and damage to surrounding structures.

BRIEF SUMMARY

A plenum for a bifurcated duct is provided. The plenum comprises an outer cylindrical body intersected by a pair of exhaust duct stubs that are configured to be coupled to a corresponding pair of exhaust ducts and an inner body. The outer cylindrical body includes an axial rear end portion. The inner body is disposed in the axial rear end portion and increases in diameter in the aft direction. The inner body comprises one of a generally axi-symmetrical body or a non-axi-symmetrical body.

A bifurcated duct is provided. The bifurcated duct comprises a plenum and a pair of exhaust ducts. The plenum comprises an outer cylindrical body intersected by a pair of exhaust duct stubs and an inner body. The outer cylindrical body includes an axial rear end portion. The inner body is disposed in the axial rear end portion and increases in diameter in the aft direction. The inner body comprises one of a generally axi-symmetrical inner body or a non-axi-symmetrical inner body. The pair of exhaust ducts is coupled to the pair of exhaust duct stubs.

An exhaust system for an aircraft is provided. The exhaust system comprises a gas turbine engine comprising an exhaust section including a diffuser and a bifurcated exhaust duct in communication with the diffuser. The bifurcated exhaust duct comprises a plenum and a pair of exhaust ducts. The plenum comprises an outer cylindrical body intersected by a pair of exhaust duct stubs and an inner body. The outer cylindrical body includes an axial rear end portion. The inner body is disposed in the axial rear end portion and increases in diameter in the aft direction. The inner body comprises one of a generally axi-symmetrical inner body or a non-axi-symmetrical inner body The pair of exhaust ducts is coupled to the pair of exhaust duct stubs.

Furthermore, other desirable features and characteristics of the bifurcated ducts including plenums for stabilizing flow therethrough and the exhaust systems will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 7 is a top plan view of an alternative embodiment of the bifurcated duct, illustrating the plenum of FIGS. 3 through 6 coupled to the pair of exhaust ducts of FIGS. 3 and 5 and defining an air gap therebetween as part of an exhaust eductor system.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to bifurcated ducts including plenums for stabilizing flow therethrough and exhaust systems including the same. The various embodiments provide reduced turbulence, flow separation, and backpressure in the bifurcated ducts, reducing noise and damage to surrounding structures that are normally created by unsteady fluid flow through conventional bifurcated ducts. As used herein, the terms "unitary", "integrally-formed, and "integral" mean a one-piece seamless structure and excludes means for maintaining parts in a fixed relationship as a single unit. The term "bifurcated duct" includes a bifurcated exhaust duct that is used in an exhaust system for a gas turbine engine.

While the advantages of the present invention as described herein will be described with reference to bifurcated exhaust ducts in exhaust systems for aircraft gas turbine engines, the teachings of the present invention are generally applicable to any bifurcated duct for stabilizing flow therethrough to reduce turbulence, unsteady flow, flow separation, and backpressure therein. Exemplary bifurcated ducts include, but are not limited to, bifurcated water ducts, bifurcated air conditioning ducts, bifurcated automobile ducts, etc. In certain embodiments, the gas turbine engine may be incorporated into an aircraft, a watercraft, a locomotive, a power generation system, or combinations thereof. The gas turbine engine may assume the form of a turbofan, turboprop, turboshaft, turbojet engine, or an auxiliary power unit, to list but a few examples.

Figure 1:
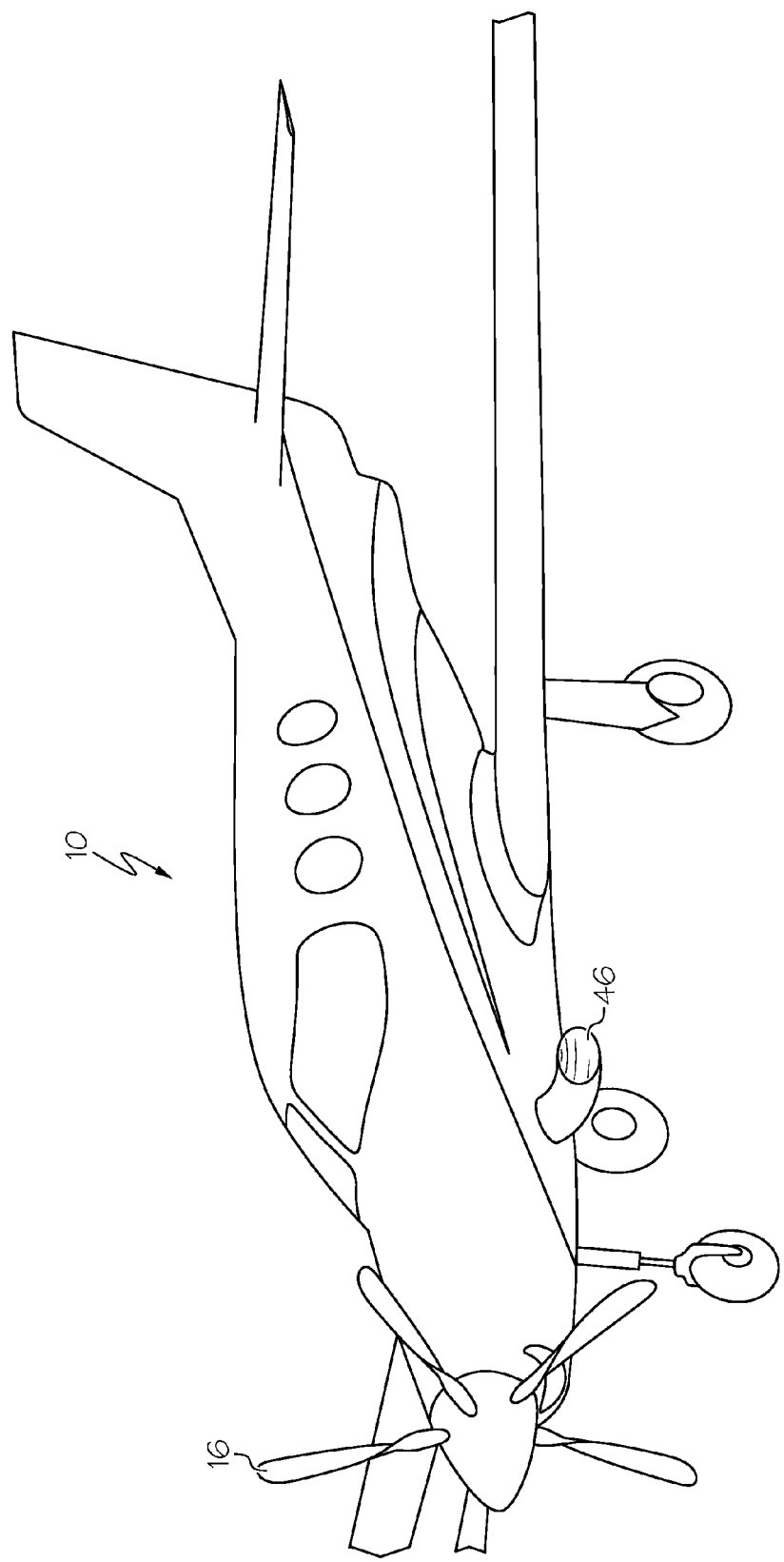
FIG. 1 depicts an exemplary single engine airplane in which a bifurcated duct according to exemplary embodiments may be incorporated.

For example, FIG. 1 depicts an exemplary airplane 10 having a forward portion (FIG. 2) that includes an exemplary turboprop gas turbine engine 14 attached to a propeller 16 in a known configuration. The illustrated gas turbine engine 14 of FIG. 2 includes a gearbox 12, an intake section 28, a compressor 18, a combustor section 20, a turbine 22, and an exhaust section 24. The turbine 22 is drivingly coupled to the compressor 18 via a shaft 26 oriented along a first longitudinal axis of the gas turbine engine. As indicated by the arrows, air may enter the gas turbine engine through an intake section 28 and flow into the compressor 18, which compresses the air prior to entry into the combustor section 20. The illustrated combustor section includes a combustor housing 30 disposed concentrically or annularly about the shaft 26 axially between the compressor and the turbine. The compressed air from the compressor 18 enters combustors where the compressed air may mix and combust with fuel within the combustors to drive the turbine. From the combustor section 20, the hot combustion gases 32 flow through the turbine 22, driving the compressor via the shaft. For example, the combustion gases may apply motive forces to turbine rotor blades within the turbine 22 to rotate the shaft 26 that drives the propeller 16. After flowing through the turbine 22, the hot combustion gases may exit the gas turbine engine 14 through the exhaust section 24. The exhaust section 24 is located behind the turbine 22 and at the rear of the engine 14. The airplane 10 may include a firewall 33.

Figure 2:
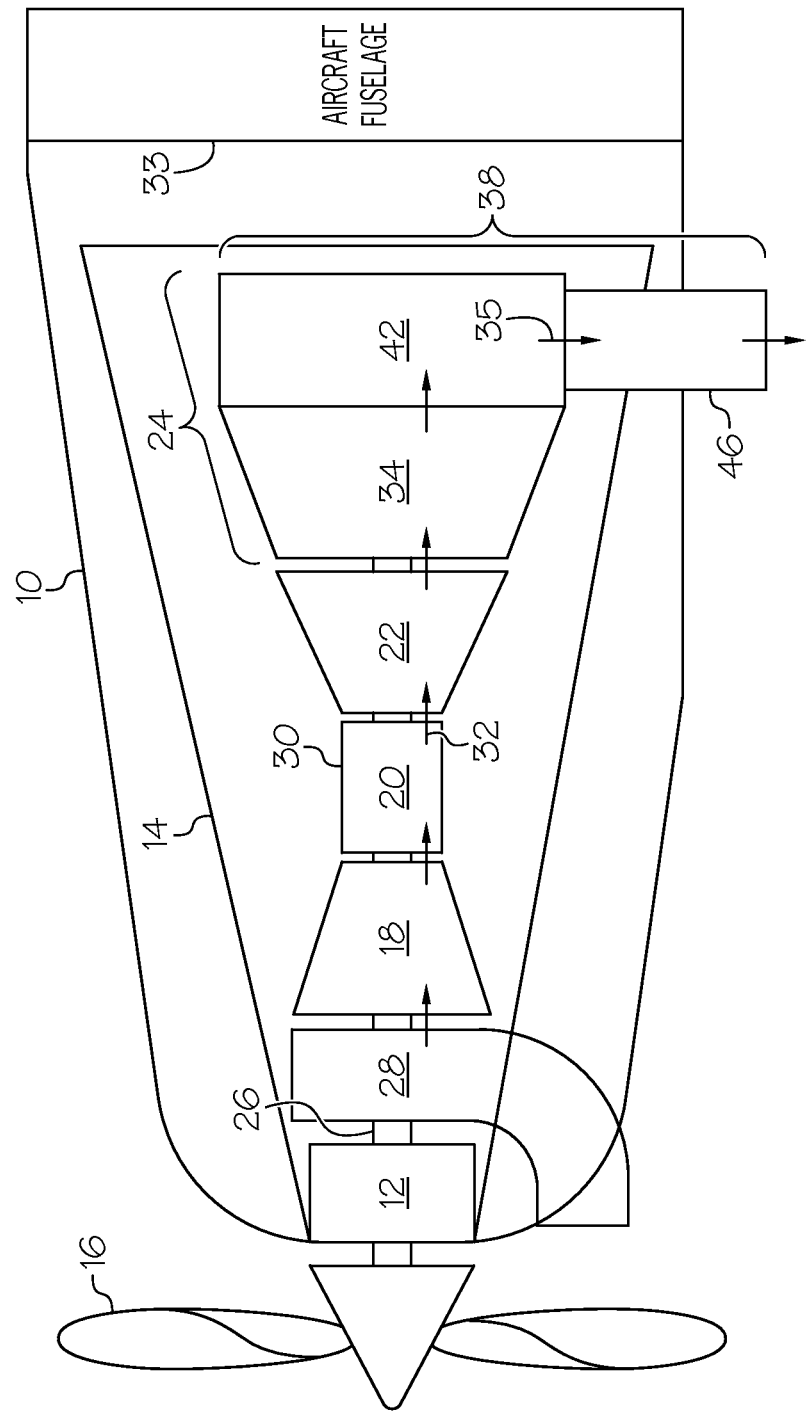
FIG. 2 is a sectional schematic view of the airplane of FIG. 1 illustrating a gearbox and an exemplary gas turbine engine (a turboprop engine) therein in communication with an embodiment of the bifurcated duct according to exemplary embodiments of the present invention.

Still referring to FIG. 2, the exhaust section 24 includes a diffuser 34 (also shown in FIGS. 3 through 7) disposed about the first longitudinal axis downstream from the turbine 22. The diffuser 34 guides the combustion gases about the shaft along the first longitudinal axis. The volume of the diffuser 34 gradually increases toward a diffuser outlet 36 (e.g., FIGS. 3 and 5), thereby gradually increasing the pressure and reducing the airflow speed within the diffuser. At the diffuser outlet 36, the exhaust gas flows into the bifurcated duct 38 (more particularly, into a plenum inlet 40 (FIGS. 3 through 7) of a plenum 42 of the bifurcated duct 38). Connector flanges 43 may be used to couple the bifurcated duct 38 to the diffuser 34 as depicted in FIGS. 3 through 7. The connector flanges are fastened together with fasteners such as bolts or the like.

Referring again to FIGS. 3 through 7, according to exemplary embodiments of the present invention, the bifurcated duct 38 including a bifurcated exhaust duct comprises the plenum 42 and a pair of exhaust ducts (first and second exhaust ducts 44 and 46 are depicted in FIGS. 3 and 7) (also referred to herein as secondary exhaust ducts) coupled thereto. The plenum 42 channels the exhaust flow (35 in FIG. 2) from the gas turbine engine 14 into the first and second exhaust ducts 44 or 144 (FIG. 7) and 46 or 146 (FIG. 7) that discharge the exhaust flow 35 into the atmosphere as hereinafter described and depicted in FIGS. 1 and 2 (A single exhaust duct 46 on one side of the airplane 10 is depicted in FIGS. 1 and 2). The plenum 42 includes the plenum inlet 40 to which the diffuser outlet 36 is fluidly coupled. The initial diameter of the plenum 42 at the plenum inlet 40 is similar or identical to the diameter of the diffuser outlet 36.

Figure 5:
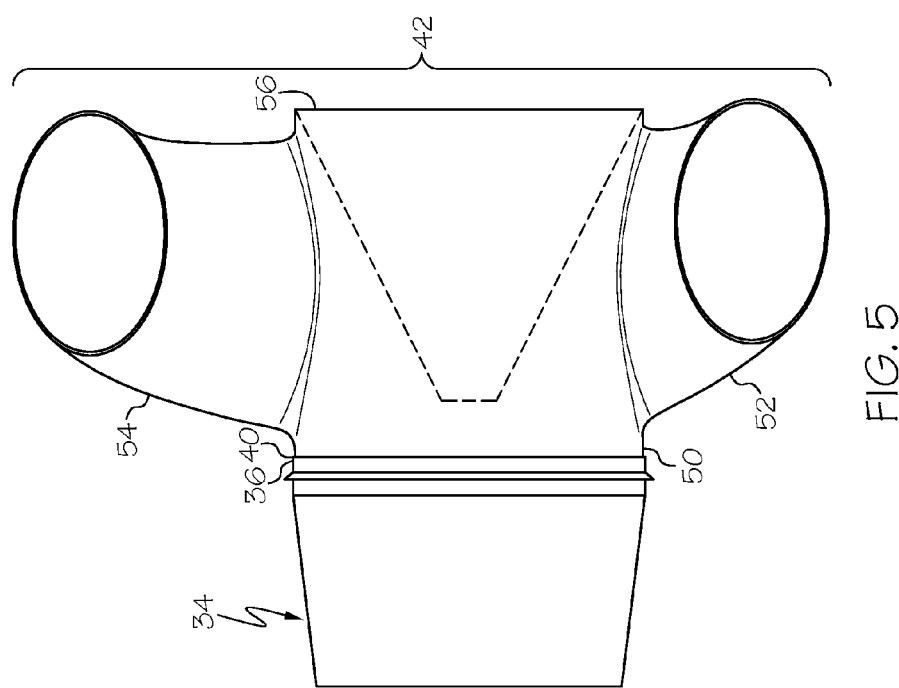
FIG. 5 is a bottom plan view of the plenum of FIG. 4, illustrating an exemplary generally axi-symmetrical inner body (in dotted lines) that increases in diameter in the aft direction and is disposed in an axial rear end portion of an outer generally cylindrical body that is intersected by a pair of exhaust duct stubs that are configured to be coupled to the pair of exhaust ducts of FIG. 3, according to exemplary embodiments of the present invention.

Still referring to FIGS. 3 through 7, in accordance with exemplary embodiments of the present invention, the plenum 42 of the bifurcated duct 38 comprises an outer cylindrical body 50 intersected by a pair of exhaust duct stubs 52 and 54 that are configured to be coupled to the corresponding pair of (secondary) exhaust ducts 44/144 and 46/146 and an inner body 56 (shown in dotted lines in FIG. 5) disposed in an axial rear end portion of the outer cylindrical body 50. The outer cylindrical body 50 has a substantially constant outer diameter and includes the axial rear end portion (that is opposite the plenum inlet at an axial front end portion). The inner body 56 has a diameter that increases in the aft direction as shown in FIG. 5. An inner surface of the wall of the outer cylindrical body is contoured to include a rounded fillet at the intersection of the exhaust duct stubs 52 and 54 with the outer cylindrical body 50 for purposes as hereinafter described. For example, the contoured wall may gradually curve around, and diverge from, an outer circumference of the diffuser to define the exhaust duct stubs. The contoured wall of the outer cylindrical body 50 reduces low velocity regions and flow separation by eliminating sudden changes in the flow direction (shown by arrows in FIG. 2).

Figure 6:
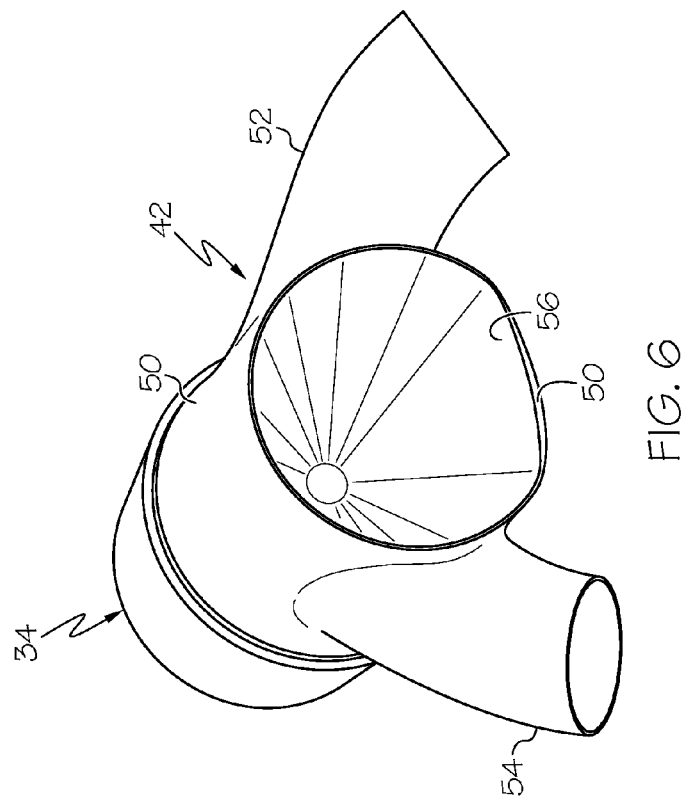
FIG. 6 is an isometric view of the plenum of FIGS. 3 through 5.

While the inner body 56 is depicted in FIGS. 5 and 6 as being generally axi-symmetrical and having a frustoconical shape, it is to be understood that the inner body may be non-axi-symmetrical and the shape of the inner body having a diameter that increases in the aft direction may be other than frustoconical (e.g., elliptical, hemispherical, conical, etc.). When disposed in the axial rear end portion of the outer cylindrical body 50, the inner body 56 decreases the area/volume of the outer cylindrical body 50 for purposes as hereinafter described. The inner body 56 may comprise a hollow body, a solid body, or a substantially solid body.

In one embodiment, the plenum 42 is a one-piece seamless unitary structure in which the outer cylindrical body 50 is integral with the inner body 56 forming a seamless unitary plenum that may be manufactured by a process such as by casting or the like. Thus, in the seamless unitary plenum, the inner body 56 is not removable or separable from the outer cylindrical body 50. Alternatively, the plenum 42 comprises a plenum assembly comprising the outer cylindrical portion 50 coupled to the inner body 56, such as by a weldment or the like. In still another exemplary embodiment, the entire bifurcated duct (such as a bifurcated exhaust duct) comprises a seamless unitary structure manufactured by a casting process or the like.

The outer cylindrical body 50 and the inner body 56 may be co-axially disposed about the first longitudinal axis of the gas turbine engine (FIG. 2) downstream of the diffuser 34. The pair of exhaust duct stubs comprises a first exhaust duct stub 52 and a second exhaust duct stub 54. The first and second exhaust duct stubs 52 and 54 extend outwardly away from the first longitudinal axis (e.g., in an approximately crosswise or radial direction) of the outer cylindrical body 50. The first and exhaust duct stubs are open-ended to allow the flow of exhaust gas therethrough. The open end of the first exhaust duct stub 52 that is spaced apart from the outer cylindrical body 50 is configured to be coupled to the first exhaust duct 44/144 that leads outside the aircraft. The open end of the second exhaust duct stub 54 that is spaced apart from the outer cylindrical body 30 is configured to be coupled to the second exhaust duct 46/146 that also leads outside the aircraft. The first and second exhaust ducts may discharge exhaust flow on opposite sides of the airplane as depicted in FIG. 1 (again, a single exhaust duct is depicted in FIG. 1).

Figure 3:
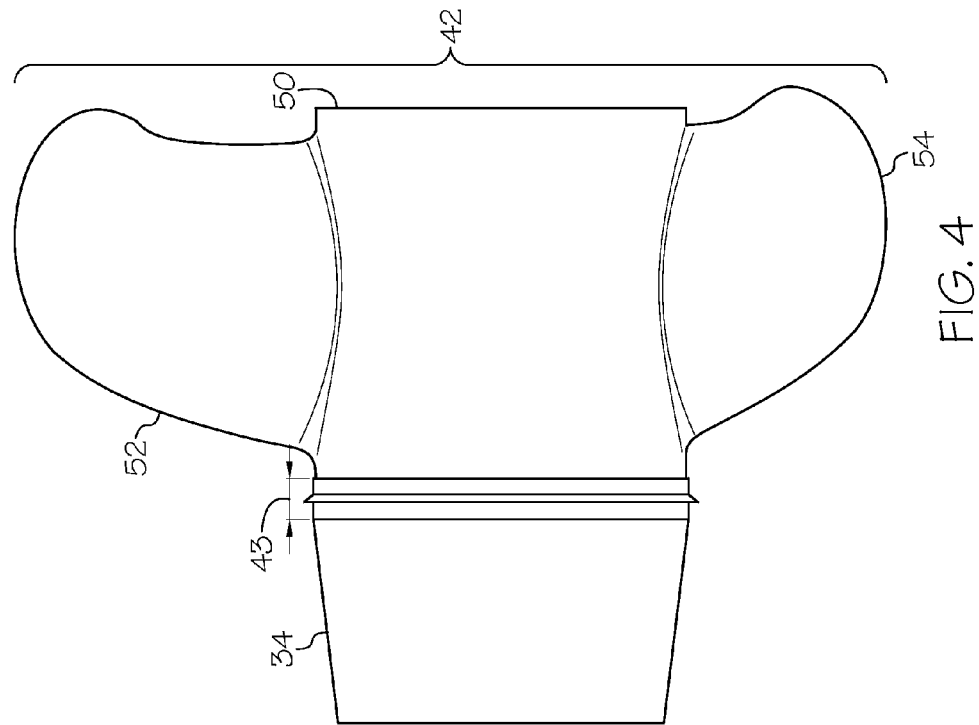
FIG. 3 is a top plan view of an embodiment of the bifurcated duct including a plenum coupled to a pair of exhaust ducts and in communication with the diffuser of FIG. 2.
Figure 4:
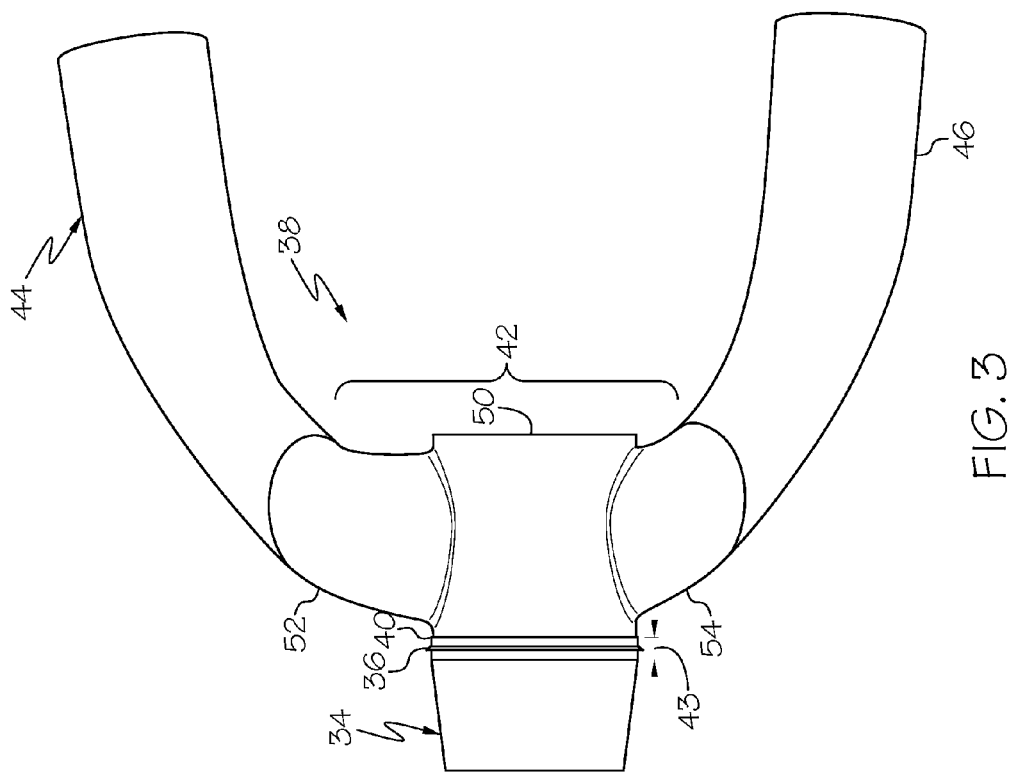
FIG. 4 is a top plan view of the plenum of the bifurcated duct of FIG. 3, illustrating the plenum in communication with the diffuser.

In an embodiment, as depicted in FIG. 3, the plenum 42 (more particularly, the first and second exhaust duct stubs 52 and 54) may be coupled to the first and second exhaust ducts 44 and 46 by connection means such as a weldment, etc. Alternatively, in an alternative exemplary embodiment as depicted in FIG. 7, the first and second exhaust duct stubs 52 and 54 of the plenum 42 are configured to be respectively coupled to the first and second exhaust ducts 144 and 146 in a manner defining a first air gap 60 between the first exhaust duct stub 52 and the first exhaust duct 144 and a second air gap 62 between the second exhaust duct stub 54 and the second exhaust duct 146. The bifurcated duct 138 depicted in FIG. 7 may be part of an exhaust gas eductor system (not shown). The primary purpose of an exhaust gas eductor system is to ventilate the engine compartment by educting compartment air into the exhaust gas flow through air gaps 60 and 62. Alternatively, if needed, it can be used to educt ambient air through air gaps 60 and 62 to mix with the hot exhaust gas 35 (FIG. 2) so as to reduce the exhaust gas temperature prior to its discharge from the exhaust ducts, with minimum effect on the performance of the engine.

In operation (see, e.g., FIG. 2), the exhaust gas 35 exits the turbine 22 through the diffuser 34 in the exhaust section 24. As the exhaust gas passes from the exhaust section to the plenum 42 of the bifurcated duct 38/138 as described herein, the exhaust gas enters the plenum 42 (see, e.g., FIG. 5) where the inner body helps to turn and isolate the flow entering the first exhaust duct stub 52 from the flow entering second exhaust duct stub 54. In addition, the inner body helps to provide a nearly constant effective flow area for the exhaust gas as it flows from the diffuser outlet 36 into the first and second exhaust duct stubs 52 and 54, thereby reducing unsteady interactions between the flow entering the two separate exhaust duct stubs 52 and 54. As a result, unsteady pressures at the turbine exit and average turbine exit pressures are reduced, providing significant improvement in engine performance while also reducing noise and vibration loads on the engine and surrounding structures.

From the foregoing, it is to be appreciated that the bifurcated ducts including plenums for stabilizing flow therethrough and exhaust systems including the same reduce turbulence, unsteady flow, flow separation, and backpressure in the bifurcated ducts, thereby reducing noise and damage to the engine and surrounding structures that are normally created by unsteady fluid flow through conventional bifurcated ducts.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A bifurcated duct, configured to receive combustion products from gas turbine engine, comprising:
a mirror symmetric plenum comprising:
an outer cylindrical body that extends along a longitudinal axis that is intersected by a pair of exhaust duct stubs that are joined to a corresponding pair of exhaust ducts at a fixed orientation, wherein the outer cylindrical body includes an inlet at an axial front end portion and an axial rear end portion opposite the inlet, and wherein the pair of exhaust duct stubs extend radially outward from the longitudinal axis; and
an inner body disposed in the axial rear end portion, wherein the inner body is frustoconical and increases in diameter in an aft direction, the inner body having a first end defined at the axial rear end portion and a second end opposite the first end,
wherein the second end extends into the outer cylindrical body towards the inlet and is spaced a distance apart from the inlet to define a chamber in the outer body between the inlet and the second end of the inner body, the chamber of the outer body has a first internal volume that is greater than a second internal volume of the outer body defined between the second end of the inner body and the axial rear end portion; and
wherein the inlet receives the combustion products and each of the pair of exhaust ducts directs the combustion products in an axial direction.

2. The bifurcated duct of claim 1, wherein the inner body and the outer cylindrical body cooperate to form the mirror symmetric plenum, wherein the mirror symmetric plenum is a seamless unitary plenum.

3. The bifurcated duct of claim 1, wherein the inner body is coupled to the outer cylindrical body to form the mirror symmetric plenum.

4. The bifurcated duct of claim 1, wherein the outer cylindrical body and the inner body are co-axially disposed.

5. The bifurcated duct of claim 1, wherein the mirror symmetric plenum is configured to be disposed between a diffuser in an exhaust section of the gas turbine engine and the pair of exhaust ducts.

6. The bifurcated duct of claim 1, wherein an inner surface of the outer cylindrical body is contoured to define a rounded fillet where intersected by the pair of exhaust duct stubs.

7. The bifurcated duct of claim 1, wherein the inner body comprises one of a hollow body, a solid body, or a substantially solid body.

8. The bifurcated duct of claim 5, wherein the gas turbine engine propels an aircraft.

9. An exhaust system for an aircraft comprising:
a gas turbine engine comprising an exhaust section including a diffuser for exhausting combustion products from the gas turbine engine; and
a bifurcated exhaust duct downstream of the diffuser, the bifurcated exhaust duct comprising:
a mirror symmetric plenum comprising:
an outer cylindrical body that extends along a longitudinal axis that is intersected by a pair of exhaust duct stubs that are joined to a corresponding pair of exhaust ducts at a fixed orientation, wherein the outer cylindrical body includes an inlet at an axial front end portion and an axial rear end portion opposite the inlet, and wherein the pair of exhaust duct stubs extend radially outward from the longitudinal axis; and
an inner body disposed in the axial rear end portion, wherein the inner body is frustoconical and increases in diameter in an aft direction, the inner body having a first end defined at the axial rear end portion and a second end opposite the first end,
wherein the second end extends into the outer cylindrical body towards the inlet and is spaced a distance apart from the inlet to define a chamber in the outer body between the inlet and the second end of the inner body, the chamber of the outer body has a first internal volume that is greater than a second internal volume of the outer body defined between the second end of the inner body and the axial rear end portion; and
wherein the inlet receives the combustion products and each of the pair of exhaust ducts directs the combustion products in an axial direction.

10. The exhaust system of claim 9, wherein the bifurcated exhaust duct comprises a seamless unitary structure.

11. The exhaust system of claim 9, wherein the mirror symmetric plenum comprises a seamless unitary plenum or a plenum assembly comprising the inner body coupled to the outer cylindrical body.

* * * * *